(12) United States Patent
Maniatopoulos (10) Patent No.: US 8,935,749 B2
(45) Date of Patent: Jan. 13, 2015

(54) METHOD FOR WIRELESS COMMUNICATION AND WIRELESS TRANSMIT/RECEIVE UNIT

(75) Inventor: Alexandros Maniatopoulos, Patras (GR)

(73) Assignee: Samsung Electronics Co., Ltd. (KR)

( * ) Notice: Subject to any disclaimer, the term of this patent is extended or adjusted under 35 U.S.C. 154(b) by 101 days.

(21) Appl. No.: 13/113,169

(22) Filed: May 23, 2011

(65) Prior Publication Data

US 2011/0321126 A1    Dec. 29, 2011

Related U.S. Application Data

(60) Provisional application No. 61/347,620, filed on May 24, 2010.

(51) Int. Cl.
*H04L 29/06* (2006.01)
*H04W 12/06* (2009.01)
*H04W 84/12* (2009.01)

(52) U.S. Cl.
CPC ........... *H04W 12/06* (2013.01); *H04L 63/0478* (2013.01); *H04L 63/16* (2013.01); *H04W 84/12* (2013.01)
USPC ................ 726/3; 726/4; 726/5; 726/6; 726/7; 713/168; 713/169; 713/170; 713/171; 713/172

(58) Field of Classification Search
CPC ............................ H04L 63/16; H03L 63/0478
USPC ............................................................ 726/3
See application file for complete search history.

(56) References Cited

U.S. PATENT DOCUMENTS

| 5,949,776 | A | * | 9/1999 | Mahany et al. | 370/338 |
| 2007/0263873 | A1 | | 11/2007 | Qi et al. | |
| 2011/0314286 | A1 | * | 12/2011 | Tie et al. | 713/171 |

FOREIGN PATENT DOCUMENTS

| CN | 101141254 | 3/2008 |
| CN | 101455024 | 6/2009 |

* cited by examiner

*Primary Examiner* — Longbit Chai
(74) *Attorney, Agent, or Firm* — The Farrell Law Firm, P.C.

(57) ABSTRACT

A method for wireless communications and a wireless transmit/receive unit are disclosed. At least one first wireless communication link with a base station for transmitting/receiving data packets is established, which at least one first wireless communication link complies with at least a first authentication mechanism. At least one second wireless communication link with at least one user device for transmitting/receiving data packets is established, which at least one second wireless communication link complies with at least a second authentication mechanism, wherein the at least one second wireless communication link comprises a peer-to-peer wireless communication link. The at least one first wireless communication link and the at least one second wireless communication link are concurrently maintained.

28 Claims, 7 Drawing Sheets

METHOD FOR WIRELESS COMMUNICATION AND WIRELESS TRANSMIT/RECEIVE UNIT

CROSS REFERENCE TO RELATED APPLICATIONS

This Non-Provisional application claims the benefit under 35 U.S.C. §119(e) of U.S. Provisional Application No. 61/347,620 filed on May 24, 2010. The entire contents of all of which are hereby expressly incorporated by reference into the present application.

TECHNICAL FIELD

The present invention relates to wireless communications. In particular, the present invention relates to wireless communications using several communication links capable of concurrently supporting different authentication mechanisms.

BACKGROUND

A wireless local area network (WLAN) typically comprises one or more WLAN terminals, e.g. a laptop computer, where a given WLAN terminal may be connected to one or more WLAN peripheral devices, e.g. a wireless mouse, a wireless keyboard, a smart phone, etc., associated with the WLAN terminal.

In order to enhance security in communications in WLANs and provide means for secure access to base stations (BSs), e.g. APs, from terminals or mobile stations (MSs), IEEE (Institute of Electrical and Electronics Engineers) has established 802.11 series standards. Furthermore, in May 2003 the People's Republic of China enacted a national standard GB15629.11 for providing security and authentication in WLANs, usually referred to as WLAN Authentication and Privacy Infrastructure (WAPI) protocol. In this regard, Wi-Fi Alliance (WFA) has proposed an authentication mechanism known as Wireless Privacy Authentication (WPA) based on IEEE 802.11i standard. In May 2003 the People's Republic of China enacted a national standard GB15629.11 for providing security and authentication in WLANs, usually referred to as WLAN Authentication and Privacy Infrastructure (WAPI) protocol, which provides an alternative method to IEEE 802.11i security standard. The authentication mechanisms in WAPI and WPA may utilize the same Physical Layer based on IEEE 802.11 specifications, but differ in encryption and key exchange procedures.

Connection between a WLAN terminal and a WLAN peripheral device is typically established via an Access Point (AP) of a communication network.

The properties of the connection between the WLAN terminal and the WLAN peripheral are such that an independent mode communication link is most effective and practical compared to an infrastructure mode communication link. Hence, when packets are communicated between the WLAN terminal and WLAN peripheral devices the WLAN terminal is generally operating in independent mode, and when packets are communicated from the WLAN terminal to another WLAN terminal the WLAN infrastructure mode is employed.

Thus, communication in a WLAN comprising a number of WLAN terminals and a number of WLAN peripheral devices, where typically each WLAN terminal is associated with one or more WLAN peripheral devices, may involve a relatively large degree switching between communication modes for WLAN terminals, which may encumber communication in the WLAN with regards to performance.

SUMMARY

It is with respect to the above considerations and others that the present invention has been made. The present invention seeks to mitigate, alleviate or eliminate one or more of the above-mentioned deficiencies and disadvantages singly or in combination. In particular, it would be desirable to achieve a method for wireless communication supporting concurrently communication links for communication with a base station such as an AP and communication with peripheral devices, respectively. It would also be desirable to achieve a method for wireless communication supporting concurrently communication links for communication with a base station such as an AP and communication with peripheral devices, respectively, capable of providing a relatively high degree of security in communications, and possibly even allowing for utilizing different authentication mechanisms for different communication links.

To achieve this, a method for wireless communication and a wireless transmit/receive unit (WTRU) having the features as defined in the independent claims are provided. Further advantageous embodiments of the present invention are defined in the dependent claims.

According to a first aspect of the present invention, there is provided a method for wireless communication, comprising establishing at least one first wireless communication link with a base station (BS) for transmitting/receiving packets, the at least one first wireless communication link complying with at least a first authentication mechanism. At least one second wireless communication link is established with at least one user device for transmitting and/or receiving packets. The at least one second wireless communication link complies with at least a second authentication mechanism. The at least one second wireless communication link is configured such that it comprises a peer-to-peer wireless communication link.

The at least one first wireless communication link and the at least one second wireless communication link are concurrently maintained by concurrently operating a first state machine and a second state machine configured to effectuate authentication of communication over the at least one first wireless communication link and the at least one second wireless communication link, respectively. The first state machine and the second state machine utilizes the at least a first authentication mechanism and the at least a second authentication mechanism, respectively.

According to a second aspect of the present invention, there is provided a WTRU comprising at least one first state machine and at least one second state machine. The WTRU comprises a communication link controller.

The communication link controller is configured to establish at least one first wireless communication link with a BS for transmitting/receiving packets, the at least one first wireless communication link complying with at least a first authentication mechanism. The communication link controller is configured to establish at least one second wireless communication link with at least one user device for transmitting/receiving packets. The at least one second wireless communication link complies with at least a second authentication mechanism. The at least one second wireless communication link is configured such that it comprises a peer-to-peer wireless communication link.

The communication link controller is configured to concurrently maintain the at least one first wireless communication link and the at least one second wireless communication link by concurrently operating the at least one first state machine and the at least one second state machine, wherein the at least one first state machine and the at least one second state machine are configured to effectuate authentication of communication over the at least one first wireless communication link and the at least one second wireless communication link, respectively. The at least one first state machine and the at least one second state machine utilizes the at least a first authentication mechanism and the at least a second authentication mechanism, respectively.

Such configuration enables maintaining the at least one first wireless communication link and the at least one second wireless communication link concurrently, which in turn may facilitate wireless communication in a wireless communication environment, such as a WLAN, or even improve wireless communication in a wireless communication environment such as a WLAN with regards to performance. This is due to that wireless communication links between a WTRU and a BS, e.g. an AP, and user devices, respectively, can be maintained concurrently. At the same time, wireless communication between a WTRU and a BS, e.g. an AP, and user devices, respectively, can be performed in a secure manner by the concurrent operation of a first state machine and a second state machine configured to effectuate authentication of communication over the at least one first wireless communication link and the at least one second wireless communication link, respectively.

In the context of some embodiments of the present invention, by the wording "packets" it is meant "data packets".

Although embodiments of the present invention are described herein with reference to packet-based communication, the present invention is also applicable in non-packet-based wireless communication schemes, e.g. using point-to-point communication links.

The at least a first and the at least a second authentication mechanism may be different.

For example, the base station (e.g., an access point [AP]) may be based on the wireless local area network (WLAN) Authentication and Privacy Infrastructure (WAPI) standard, while the at least one user device is based on another standard for authentication. Thus, the first authentication mechanism may comprise an authentication mechanism conforming with WAPI standard.

The at least one user device may comprise one or more peripheral Wi-Fi enabled device, i.e. capable of operating in accordance with Wi-Fi. Such a user device may for example comprise a Human Interface Device (HID) a cellular or mobile telephone, a mouse, a keyboard, a touchpad, a webcam, a headset and a printer.

Hence, the at least one user device may utilize a Wi-Fi Alliance standard such as Wi-Fi Direct or Independent Basic Service Set (IBSS). Thus, the second authentication mechanism may comprise an authentication protocol conforming with a Wi-Fi Alliance standard, such as Wi-Fi Direct, or IBSS.

The at least one first wireless communication link and the at least one second wireless communication link may be concurrently maintained independently of each other. For example, the at least one first state machine and the at least one second state machine may be run in parallel and operate independently of each other. Such a configuration may enable increasing the flexibility with regards to handling of communication links utilizing different authentication mechanisms in wireless communication.

At least one first physical address may be associated with the at least one first wireless communication link. At least one second physical address may be associated with the at least one second wireless communication link. Such a configuration may facilitate any packet arbitration and/or recognition procedures performed during or as a part of transmitting and/or receiving packets, respectively. This is further discussed in the following.

Destination address information of received packets and/or packets to be transmitted may be compared with the at least one first physical address and the at least one second physical address. The wireless communication link to be used for receiving and/or transmitting a packet, respectively (i.e. of the at least one first wireless communication link and the at least one second wireless communication link), may be selected on basis of the comparison.

Alternatively or optionally, capability information of received packets and/or packets to be transmitted may be compared with requirements of the first authentication mechanism and the second authentication mechanism. The wireless communication link to be used for receiving and/or transmitting a packet, respectively, may be selected on basis of the comparison.

Capability information may for example comprise information regarding type of network.

Source address information of packets to be transmitted may be compared with the at least one first physical address and the at least one second physical address. The wireless communication link to be used for transmitting a packet may be selected on basis of the comparison.

Thus, with reference to the three configurations as described immediately in the foregoing, packet arbitration and/or packet recognition may be realized in a flexible manner with regards to adaptability to different packet configurations.

Frames may be encoded into packets, wherein each frame comprises destination address information, source address information and/or capability information. The comparisons as described with reference to the embodiments as described in the foregoing may be performed by accessing the frames in packets, and obtaining the relevant information (e.g. by reading information from a frame).

Packets may be transmitted over the at least one first wireless communication link and over the at least one second wireless communication link using a backoff mechanism configured to control access to a communication channel on the at least one first wireless communication link and the at least one second wireless communication link, respectively.

Packets may be transmitted over the at least one first wireless communication link and over the at least one second wireless communication link using a backoff mechanism using a single backoff mechanism.

The WTRU may comprise an interface unit comprising at least one first physical address associated with the at least one first wireless communication link and at least one second physical address associated with the at least one second wireless communication link.

The WTRU may comprise a packet recognition mechanism and/or a packet arbitration mechanism.

The packet recognition mechanism may be configured to compare destination address information of received packets with the at least one first physical address and the at least one second physical address, and select usage of the first wireless communication link and the second wireless communication link for receiving a packet on basis of the comparison.

The packet recognition mechanism may be configured to compare capability information of received packets with requirements of the first authentication mechanism and the second authentication mechanism, and select usage of the first wireless communication link and the second wireless communication link for receiving a packet on basis of the comparison.

The packet arbitration mechanism may be configured to compare destination address information of packets with the at least one first physical address and the at least one second physical address, and select usage of the first wireless communication link and the second wireless communication link for transmitting a packet on basis of the comparison.

The packet arbitration mechanism may be configured to compare capability information of packets with requirements of the first authentication mechanism and the second authentication mechanism, and select usage of the first wireless communication link and the second wireless communication link for transmitting a packet on basis of the comparison.

The packet arbitration mechanism may be configured to compare source address information of packets with the at least one first physical address and the at least one second physical address, and select usage of the wireless communication link for transmitting a packet on basis of the comparison.

The WTRU may comprise a backoff mechanism.

The backoff mechanism may be configured to control access to a communication channel on the at least one first wireless communication link and the at least one second wireless communication link for transmitting packets over the at least one first wireless communication link and over the at least one second wireless communication link, respectively;

The backoff mechanism may be activated by the packet arbitration mechanism.

The backoff mechanism may be a backoff mechanism that is part of a Media Access Control (MAC) protocol. In case only one transmitting node may use the a communication channel at any given time, the MAC protocol may suspend other transmitting nodes while the wireless media is busy. A backoff mechanism is often included in the MAC protocol in order to determine the length of node suspension.

The WTRU may comprise at least one ciphering/deciphering engine configured to support operation of authentication protocol of at least one of the at least a first authentication mechanism and the at least a second authentication mechanism.

Such a ciphering/deciphering engine may be operated or run concurrently or sequentially with regards to operation of the communication link controller, e.g., according to capability and/or capacity requirements.

According to a third aspect of the present invention, there is provided a computer program product adapted to, when executed in a processor unit, perform a method according to an embodiment of the present invention.

According to a fourth aspect of the present invention, there is provided a computer-readable storage medium on which there is stored a computer program product adapted to, when executed in a processor unit, perform a method according to an embodiment of the present invention.

Such a processing unit, or microprocessor, may for example be comprised in a WTRU according to the second aspect of the present invention or an embodiment thereof. Alternatively or optionally, such processing unit or microprocessor may be arranged externally in relation to the WTRU, with the processing unit or microprocessor being electrically connected to the WTRU.

Examples of computer-readable storage mediums comprise a read only memory (ROM), a random access memory (RAM), a register, a cache memory, a semiconductor memory device, magnetic media such as an internal hard disk and/or a removable disk, magneto-optical media and optical media such as a CD-ROM disk and/or a digital versatile disk (DVD).

Examples of suitable processing units comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC) and/or a state machine.

The present invention relates to all possible combinations of features recited in the claims.

Further objects and advantages of the various embodiments of the present invention will be described below by means of exemplifying embodiments.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the invention are shown. This invention may however be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements throughout.

Each of the various actions and operations in accordance with methods as described herein and/or defined in the claims can be performed by specialized circuits (e.g., comprising interconnected discrete logic gates configured to perform a specialized function), by program instructions being executed by one or more processing units, or by a combination of both. Such program instructions may be run concurrently or sequentially, e.g., according to capacity and/or capability requirements. Moreover, the embodiments of the present invention may be realized within any form of computer-readable carrier or storage medium, such as a solid-state memory, a magnetic disk, an optical disk or a carrier wave (such as radio frequency, audio frequency or optical frequency carrier waves) containing an appropriate set of machine instructions that would cause a processing unit to perform any method or steps of any method as described herein and/or defined in the claims. Thus, the various aspects of the present invention may be embodied in many different forms. All such forms are contemplated to be within the scope of the present invention.

When referred to herein, the terminology "WTRU" includes but is not limited to user equipment (UE), a mobile station, a fixed or mobile subscriber unit, a pager, a mobile or cellular telephone, a personal digital assistant (PDA), a stationary or portable computer, a digital camera, an eBook, a portable media player or any other type of user device capable of operating in a wireless environment. Such user devices may comprise one or more wireless transceivers capable of operating in accordance with an 802.11 IEEE compliant standard.

When referred to hereafter, the terminology "base station" includes but is not limited to a Node-B, an evolved Node-B (e-Node-B), a site controller, an access point (AP) or any other type of interfacing device capable of operating in a wireless environment.

When referred to herein, the terminology "Wi-Fi enabled device" includes but is not limited to a mouse, a keyboard, a touchpad, a webcam, a mobile or cellular telephone, a headset or any other Human Interface Device (HID), a printer, a smart phone or any other user device capable of operating in accordance with Wi-Fi.

The present application applies to any wireless communication scheme that is employed for effectuating communication in a WLAN, such as a spread spectrum scheme or orthogonal frequency-division multiplexing.

Figure 1:
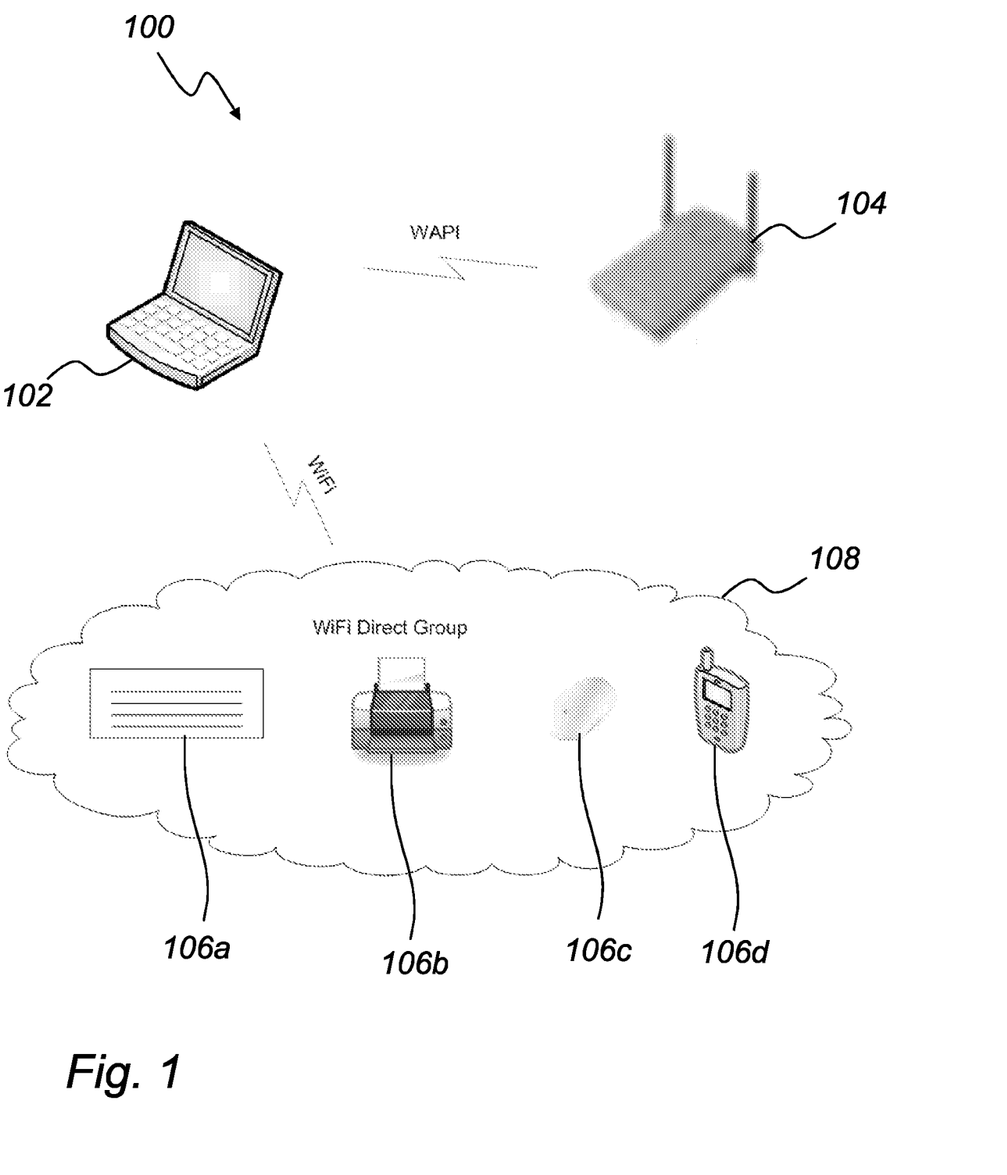
FIG. 1 is a schematic view of devices in a WLAN in accordance with an exemplifying embodiment of the present invention.

Referring now to FIG. 1, there is shown a schematic view of devices in a WLAN 100 in accordance with an exemplifying embodiment of the present invention, the WLAN 100 comprising a WTRU 102, an AP 104, and a plurality of user devices 106a, 106b, 106c, 106d. As depicted in FIG. 1, the WTRU 102 can for example comprise a laptop computer comprising wireless transmit/receive capability, e.g. comprising a transceiver operating in accordance with an IEEE 802.11 compliant standard, which transceiver incorporates, e.g., radio frequency (RF), modem and MAC functions in accordance with the IEEE 802.11 compliant standard.

In accordance with the embodiment described with reference to FIG. 1, the WTRU 102 is capable of establishing a first wireless communication link with the AP 104 for transmitting/receiving packets to and from the AP 104, respectively. In this example, the first wireless communication link complies with a first authentication mechanism incorporated in a WAPI protocol.

The WTRU 102 is further capable of establishing a second wireless communication link with the user devices 106a, 106b, 106c, 106d, respectively, for transmitting/receiving packets to and from the respective use devices 106a, 106b, 106c, where the second wireless communication link comprises a peer-to-peer wireless communication link.

In this example, the user devices 106a, 106b, 106c, 106d constitute Wi-Fi enabled devices. According to a typical but specific example, the user devices 106a, 106b, 106c, 106d are Wi-Fi only capable. This may due to, e.g., cost efficiency or another reason.

Thus, in this example, the second wireless communication link complies with a second authentication mechanism incorporated in an authentication protocol conforming with a Wi-Fi Alliance standard, e.g. Wi-Fi-Direct. Hence, the user devices 106a, 106b, 106c, 106d may constitute Wi-Fi Direct group client equipment part of a Wi-Fi Direct group 108. In this example, the group owner of the Wi-Fi Direct group can be the WTRU 102.

However, the WTRU 102 may alternatively constitute a Wi-Fi Direct group client of the Wi-Fi Direct group 108, with another wireless communication device being group owner of the Wi-Fi Direct group 108.

The user devices 106a, 106b, 106c, 106d may alternatively or optionally be capable of communicating with the WTRU 102 by means of other communication protocols, e.g. in Independent Basic Service Set (IBSS) mode, i.e. ad-hoc. Thus, the user devices 106a, 106b, 106c, 106d may not be restricted to communicating with the WTRU 102 as members of a Wi-Fi Direct group.

As indicated in FIG. 1, the user devices 106a, 106b, 106c, 106d may comprise HIDs such as a mouse, a keyboard, a printer, a Wi-Fi smart telephone, etc.

The WTRU 102 is configured to concurrently maintain the first wireless communication link and the second wireless communication link by concurrently operating a first state machine and a second state machine. The first state machine and the second state machine are configured to effectuate authentication of communication over the first wireless communication link and the second wireless communication link, respectively. The first state machine utilizes the first authentication mechanism. The second state machine utilizes the second authentication mechanism.

In this example, the user devices 106a, 106b, 106c, 106d require only peer-to-peer communication capability with the WTRU 102.

Figure 2A:
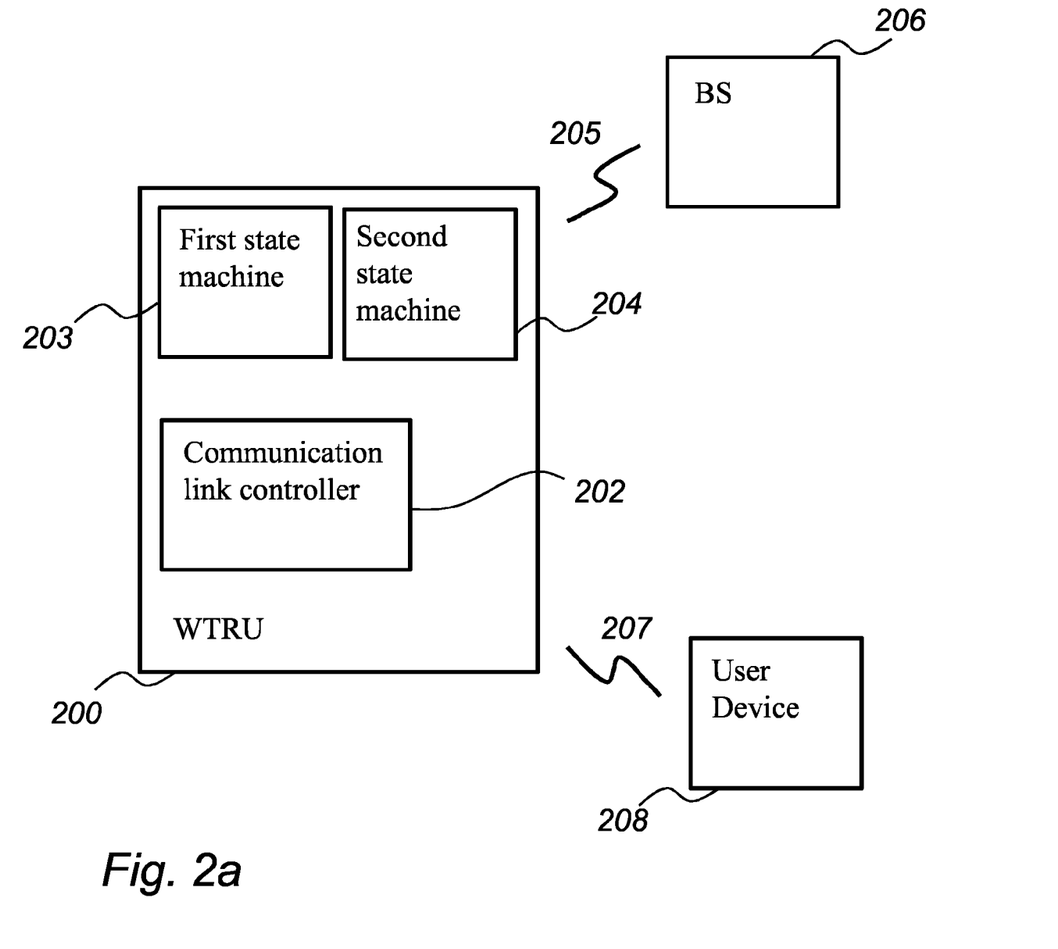
FIG. 2a is a schematic block diagram of a WTRU according to an exemplifying embodiment of the present invention.

Referring now to FIG. 2a, there is shown a schematic block diagram of a WTRU 200 according to an exemplifying embodiment of the present invention.

The WTRU 200 comprises a communication link controller 202 configured to establish at least one first wireless communication link 205 with a BS 206 for transmitting/receiving packets, where the at least one first wireless communication link 205 complies with at least a first authentication mechanism.

The at least one first wireless communication link 205 may be established with several BSs, and not merely with a single BS as depicted in FIG. 2a.

The communication link controller 202 is configured to establish at least one second wireless communication link 207 with a user device 208 for transmitting/receiving packets. The communication link controller 202 is configured to establish the at least one second wireless communication link 207 such that it comprises a peer-to-peer wireless communication link, and where the at least one second wireless communication link 207 complies with at least a second authentication mechanism.

The at least one second wireless communication link 207 may be established with several user devices, and not merely with a single user device 208 as depicted in FIG. 2a (cf. FIG. 1).

The WTRU 200 comprises a first state machine 203 and a second state machine 204.

The communication link controller 202 is configured to concurrently maintain the at least one first wireless communication link 205 and the at least one second wireless communication link 207 by concurrently operating the first state machine 203 and the second state machine 204.

The first state machine 203 and the second state machine 204 are configured to effectuate authentication of communication over the first wireless communication link 205 and the second wireless communication link 207, respectively. The first state machine 203 and the second state machine 204 utilizes the at least a first authentication mechanism and the at least a second authentication mechanism, respectively.

There may be several first state machines and/or several second state machines comprised in the WTRU, depending, e.g., on application, design and/or capacity requirements.

Figure 2B:
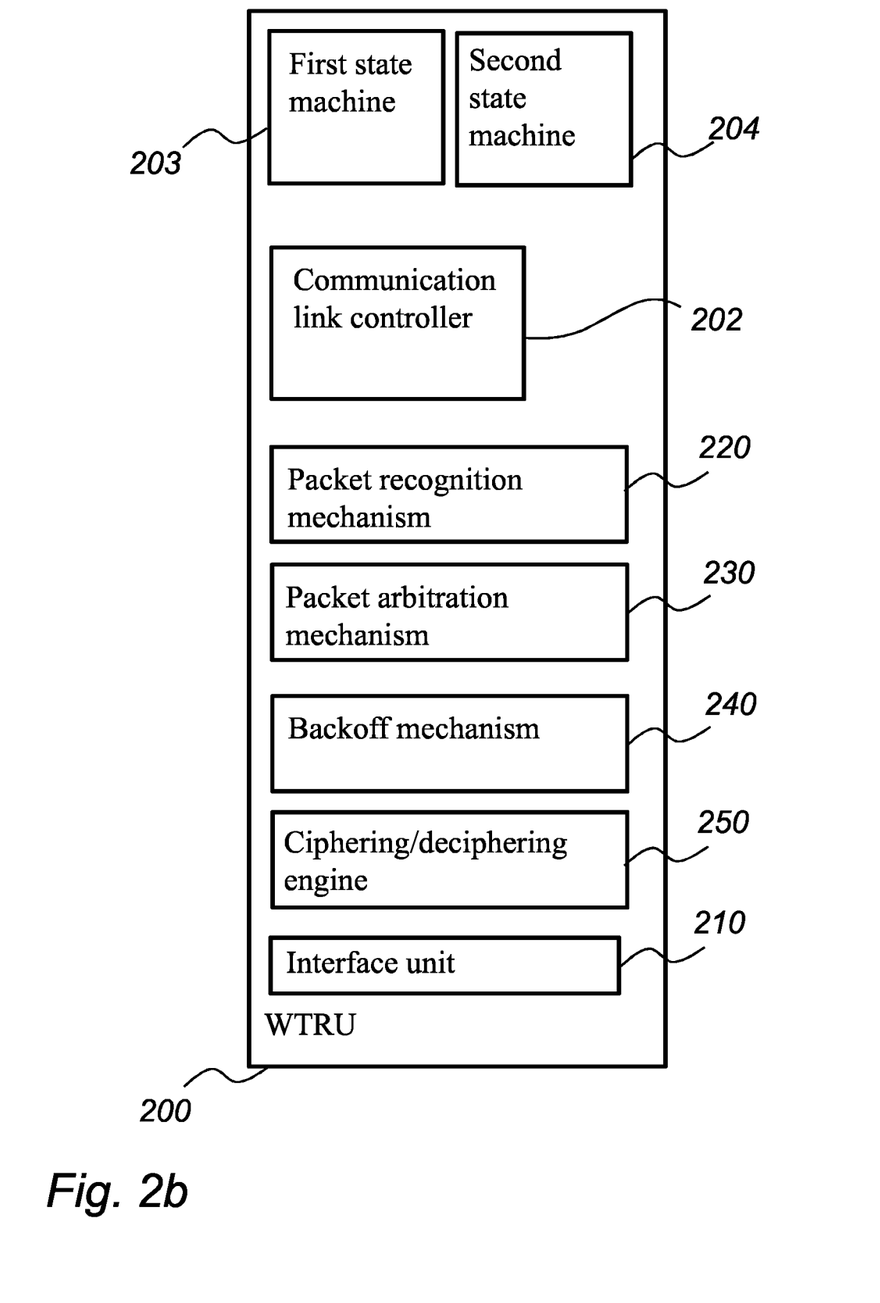
FIG. 2b is a schematic block diagram of a WTRU according to an exemplifying embodiment of the present invention.

Referring now to FIG. 2b, there is shown a schematic block diagram of a WTRU 200 according to an exemplifying embodiment of the present invention. The WTRU 200 comprises a communication link controller 202, a first state machine 203 and a second state machine 204. These components are similar or identical to the corresponding components described with reference to FIG. 2a. Therefore these components are not described further with reference to FIG. 2b.

With further reference to FIG. 2b, the WTRU 200 comprises an interface unit 210, a packet recognition mechanism 220, a packet arbitration mechanism 230, a backoff mechanism 240 and a ciphering/deciphering engine 250. Each of these components are optional and one or more of them may be comprised in the WTRU 200, in any combination. These components are described further in the following.

The interface unit 210 comprises at least one first physical address associated with the at least one first wireless communication link (not shown in FIG. 2b, see FIG. 2a) and at least one second physical address associated with the at least one second wireless communication link (not shown in FIG. 2b, see FIG. 2a). Such a configuration may facilitate any packet arbitration and/or recognition procedures performed during or as a part of transmitting and/or receiving packets, respectively, by means of the packet arbitration mechanism 230 and the packet recognition mechanism 220, respectively. This is further discussed in the following.

According to one example, the packet recognition mechanism 220 and the packet arbitration mechanism 230 are configured to compare destination address information of received packets and/or packets to be transmitted, respectively, with the at least one first physical address and the at least one second physical address. The wireless communication link to be used for receiving and/or transmitting a packet, respectively (i.e. of the first wireless communication link and the second wireless communication link), is then selected on basis of the comparison.

Alternatively or optionally, the packet recognition mechanism 220 and the packet arbitration mechanism 230 are configured capability information of received packets and/or packets to be transmitted, respectively, with requirements of the first authentication mechanism and the second authentication mechanism. The wireless communication link to be used for receiving and/or transmitting a packet, respectively, is then selected on basis of the comparison.

Alternatively or optionally, the packet arbitration mechanism 230 may compare source address information of packets to be transmitted with the at least one first physical address and the at least one second physical address. The wireless communication link to be used for transmitting a packet is then selected on basis of the comparison.

The backoff mechanism 240 is configured to control access to a communication channel on the first wireless communication link and the second wireless communication link for transmitting packets over the at least one first wireless communication link and over the at least one second wireless communication link, respectively.

The backoff mechanism 240 may be activated by the packet arbitration mechanism 230. In other words, operation of the backoff mechanism 240 may be performed upon instructions from the packet arbitration mechanism 240.

The ciphering/deciphering engine 250 is configured to support operation of authentication protocol of at least one of the at least a first authentication mechanism and the at least a second authentication mechanism.

Figure 3:
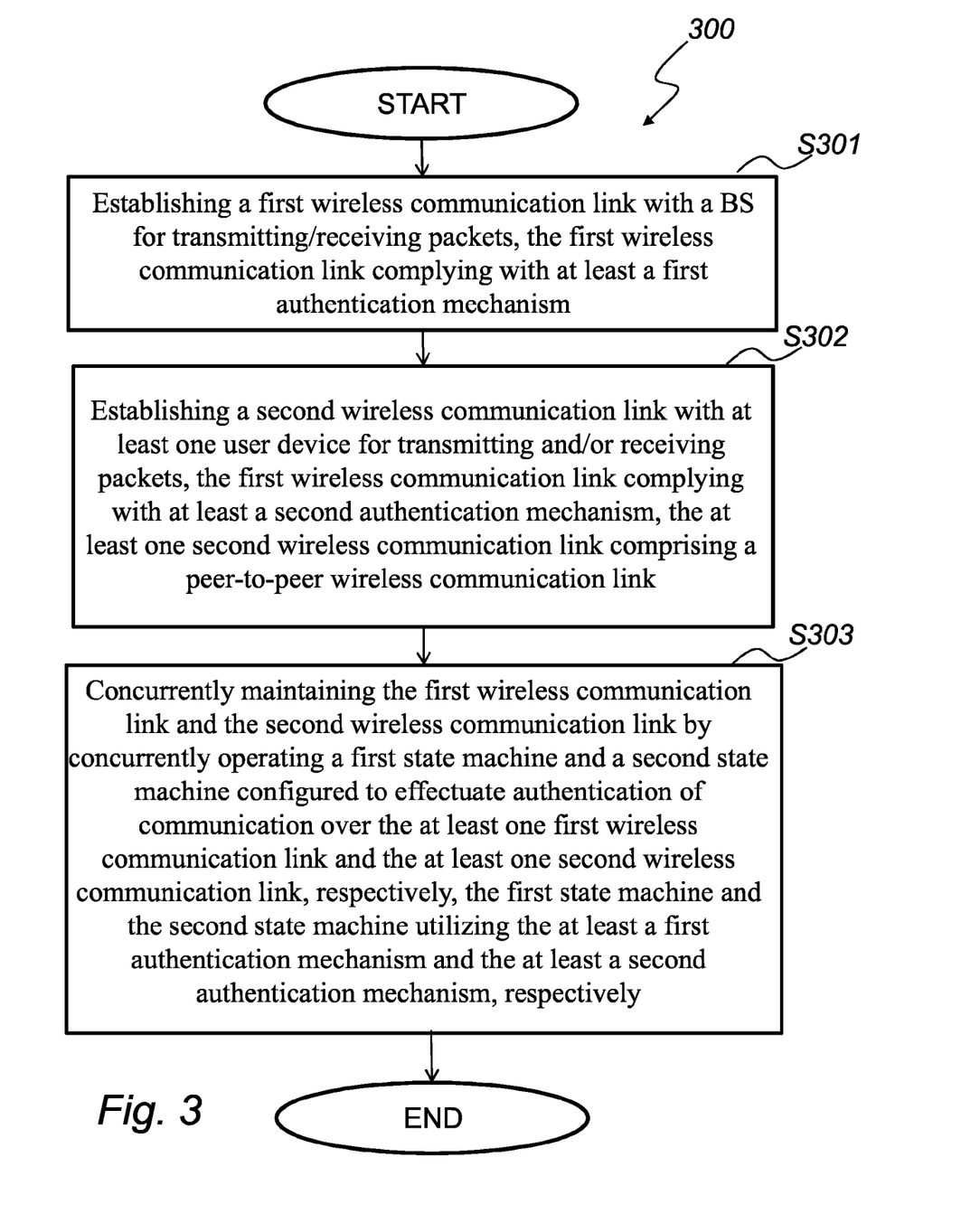
FIG. 3 is a schematic flowchart of a method according to an exemplifying embodiment of the present invention.

Referring now to FIG. 3, there is shown a schematic flowchart of a method 300 for wireless communication according to an exemplifying embodiment of the present invention.

At step S301, at least one first wireless communication link with a base station is established for transmitting/receiving packets, the at least one first wireless communication link complying with at least a first authentication mechanism.

At step S302, at least one second wireless communication link with at least one user device is established for transmitting/receiving packets, the at least one second wireless communication link complying with at least a second authentication mechanism. The at least one second wireless communication link is established in such a way that it comprises a peer-to-peer wireless communication link.

At step S303, the at least one first wireless communication link and the at least one second wireless communication link are concurrently maintained. This is performed by concurrently operating a first state machine and a second state machine, configured to effectuate authentication of communication over the at least one first wireless communication link and the at least one second wireless communication link, respectively. The first state machine and the second state machine utilizes the at least a first authentication mechanism and the at least a second authentication mechanism, respectively.

Figure 4A:
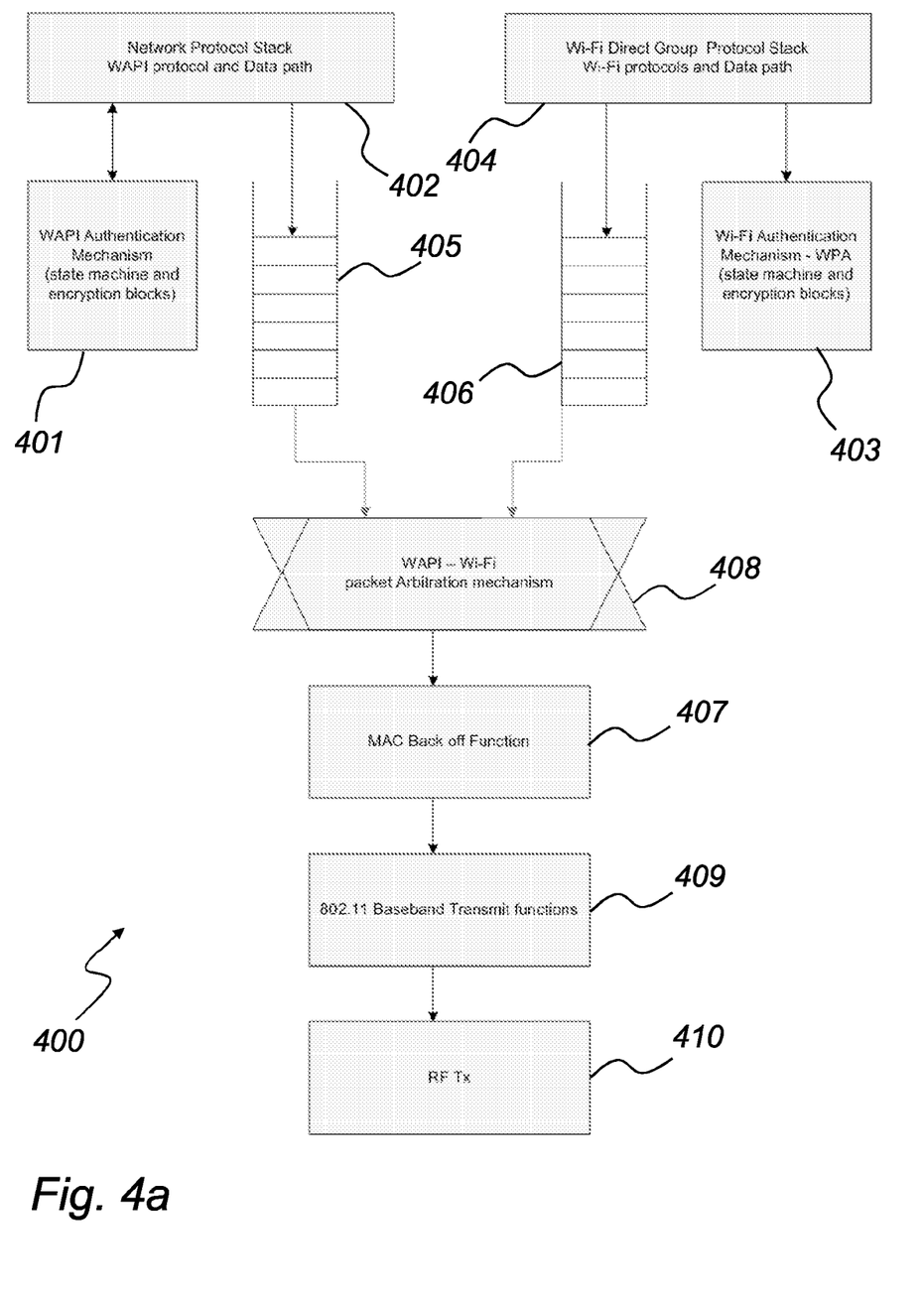
FIG. 4a is a schematic transmit data path and control architecture of a WTRU according to an exemplifying embodiment of the present invention.

Referring now to FIG. 4a, there is shown an example of a transmit data path and control architecture 400 of a WTRU complying with an IEEE 802.11 standard, in accordance with an embodiment of the present invention. In this example, the WTRU comprises a transceiver (not shown in FIG. 4a) operating in accordance with an 802.11 IEEE compliant standard, which transceiver incorporates, e.g., radio frequency (RF), modem and MAC functions in accordance with the IEEE 802.11 compliant standard. The WTRU is capable of establishing a wireless communication link with an AP, which wireless communication link complies with an authentication mechanism conforming with the WAPI standard, and a wireless communication link with user devices, which wireless communication link complies with the Wi-Fi Alliance standard Wi-Fi Direct.

Thus, in this example two authentication mechanisms are running in parallel and independently in the WTRU by means of two state machines. A WAPI authentication mechanism 401 is dedicated to the network protocol stack 402, which generates packets to be transmitted over a WAPI compliant wireless communication link that the WTRU has established with an AP. A Wi-Fi authentication mechanism 403, WPA, is utilized to provide privacy and authentication in communication over the Wi-Fi type of communication link between the WTRU and peripheral devices or user devices, and possibly in generation of packets to be communicated over the Wi-Fi type of communication link between the WTRU and peripheral devices or user devices. The Wi-Fi authentication mechanism is dedicated to the Wi-Fi Direct Group protocol stack 404.

By means of each of the authentication mechanisms 401, 403, packets are made ready for transmission, which packets may be temporarily stored in a single data buffer or several data buffers (referenced in FIG. 4a by 405 and 406 for the two authentication mechanisms, respectively).

A single IEEE 802.11 MAC backoff mechanism 407 is activated by a WAPI-Wi-Fi packet arbitration mechanism 408 for transmitting the packets from the buffers 405, 406 via the IEEE 802.11 compliant modem (IEEE 802.11 Baseband Transmit Functions 409) to the air through Radio Frequency (RF) Tx block (referenced in FIG. 4*a* by the reference numeral 410).

Figure 4B:
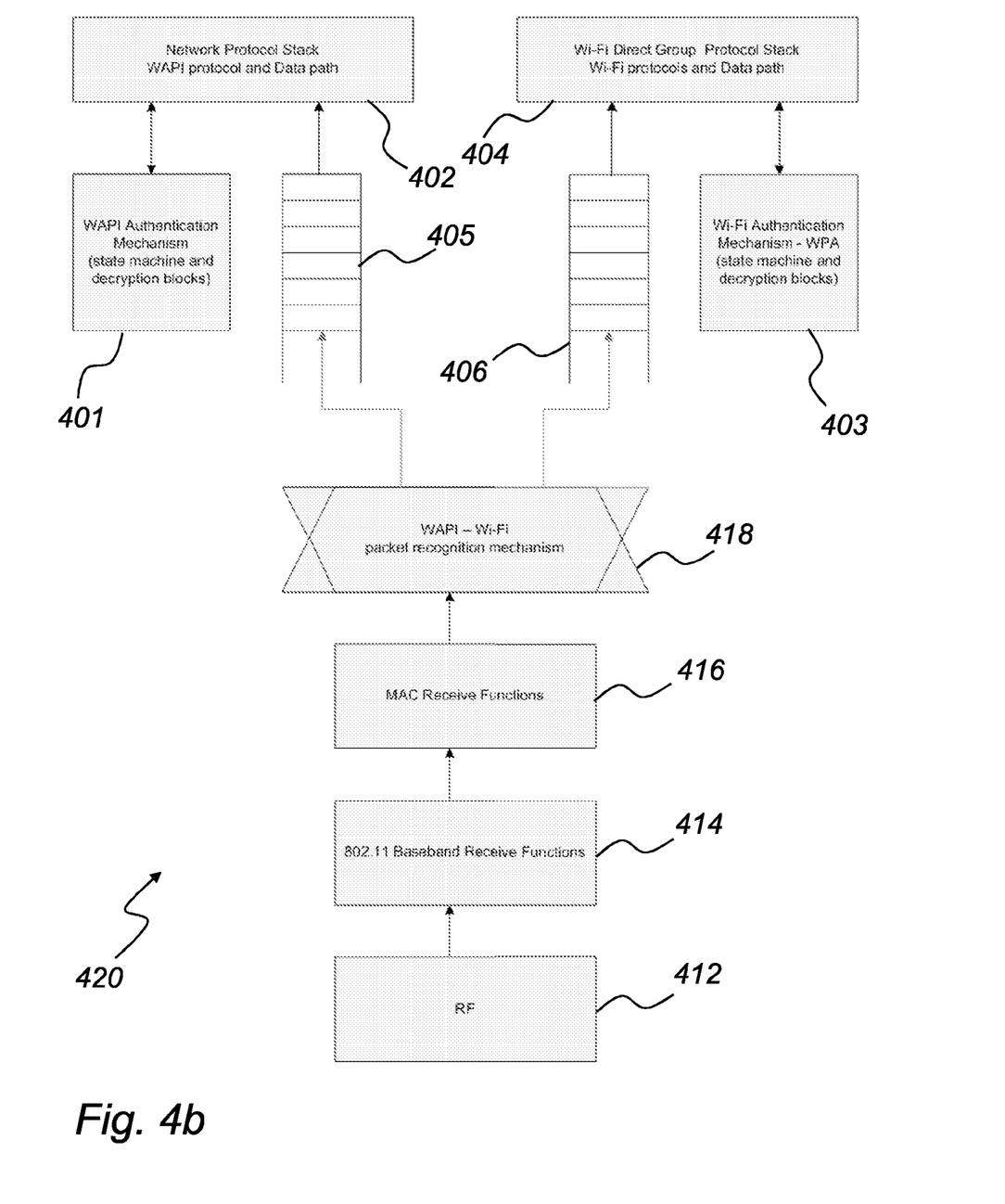
FIG. 4b is a schematic receive data path and control architecture of a WTRU according to an exemplifying embodiment of the present invention.

Referring now to FIG. 4*b*, there is shown an example of a receive data path and control architecture 420 of the WTRU described with reference to FIG. 4. In this example, after establishment of wireless communication links with the AP and the user devices has been performed, packets may be received on a single frequency channel, which packets are processed initially by the same functional blocks of the physical layer. These functional blocks are denoted by "RF Rx" 412 and "802.11 Baseband Receive functions" 414 in FIG. 5. Packets are subsequently processed by MAC receive functions 416. The WTRU may support one or several physical addresses for purposes of, e.g., identification. The AP transmits unicast packets to the WTRU using one of the physical addresses in the Destination Address (DA) field of the packets, while the user devices may use the same physical address or a different physical address in the DA field of the packets that the user devices transmit to the WTRU. The "WAPI-Wi-Fi packet recognition mechanism" block 418 is configured to identify the originator of the received packet from its source address (SA) field and also to distinguish between WAPI and Wi-Fi type of packets based on the DA field or other fields of the packet.

The "WAPI-Wi-Fi packet recognition mechanism" block 418 may be configured to signal the transmit data path and control architecture 400 (see FIG. 4*a*) to acknowledge reception of the packet if the packet has been received correctly.

The decision generated by "WAPI-Wi-Fi packet recognition mechanism" 418 on reception of a packet may trigger one of at least two state machines.

One state machine is configured to effectuate authentication of communication over the WAPI-type wireless communication link. Another state machine is configured to effectuate authentication of communication over the Wi-Fi-type wireless communication link. In other words, one state machine is responsible for the WAPI authentication mechanism 401 and another state machine is responsible for the Wi-Fi authentication mechanism 403.

The received packets may be stored in the appropriate buffers 405, 406 for further processing of the received packets, such as decryption of the received packet using the appropriate keys generated by each authentication mechanism 401, 403.

Figure 5:
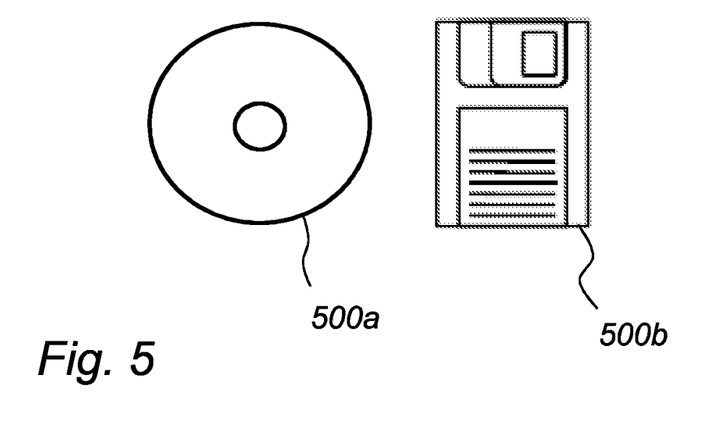
FIG. 5 is a schematic view of digital storage mediums according to exemplifying embodiments of the present invention.

Referring now to FIG. 5, there are shown schematic views of computer readable digital storage mediums 500*a*, 500*b* according to exemplifying embodiments of the present invention, comprising a Digital Versatile Disc (DVD) 500*a* and a floppy disk 500*b*. On each of the DVD 500*a* and the floppy disk 500*b* there may be stored a computer program comprising computer code adapted to perform, when executed in a processor unit, a method according to the present invention or embodiments thereof, as has been described in the foregoing.

Although only two different types of computer-readable digital storage mediums have been described above with reference to FIG. 5, the present invention encompasses embodiments employing any other suitable type of computer-readable digital storage medium, such as, but not limited to, a non-volatile memory, a hard disk drive, a CD, a flash memory, magnetic tape, a USB stick, a Zip drive, etc., or any other suitable type of digital storage medium mentioned in the foregoing.

The WTRU may comprise one or more microprocessors (not shown) or some other device with computing capabilities, e.g. an application specific integrated circuit (ASIC), a field programmable gate array (FPGA), a complex programmable logic device (CPLD), etc., in order to perform operations as described herein.

When performing steps of different embodiments of the method of the present invention, the microprocessor typically executes appropriate software that is downloaded to the WTRU and stored in a suitable storage area, such as, e.g., a Random Access Memory (RAM), a flash memory or a hard disk, or software that has been stored in a non-volatile memory, e.g., a Read Only Memory (ROM). Such a microprocessor or processing unit may alternatively or optionally be located externally relatively to the WTRU (and electrically connected to the WTRU).

In conclusion, a method for wireless communications and a wireless transmit/receive unit have been disclosed. At least one first wireless communication link with a base station for transmitting/receiving data packets is established, which at least one first wireless communication link complies with at least a first authentication mechanism. At least one second wireless communication link with at least one user device for transmitting/receiving data packets is established, which at least one second wireless communication link complies with at least a second authentication mechanism, wherein the at least one second wireless communication link comprises a peer-to-peer wireless communication link. The at least one first wireless communication link and the at least one second wireless communication link are concurrently maintained.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope.

The invention claimed is:

1. A method for wireless communication, comprising:
    establishing at least one first wireless communication link at a first device with a base station for transmitting/receiving packets, the at least one first wireless communication link complying with at least a first authentication mechanism;
    establishing at least one second wireless communication link at the first device with at least one user device for transmitting/receiving packets, the at least one second wireless communication link complying with at least a second authentication mechanism, wherein the at least one second wireless communication link comprises a peer-to-peer wireless communication link; and
    concurrently maintaining at the first device the at least one first wireless communication link and the at least one second wireless communication link by concurrently operating a first state machine and a second state machine configured to effectuate authentication of communication over the at least one first wireless communication link and the at least one second wireless communication link, respectively,
    wherein the first state machine and the second state machine are separate devices different from the first device that utilize the at least a first authentication mechanism and the at least a second authentication mechanism, respectively, and wherein the at least a first authentication mechanism and the at least a second authentication mechanism are different from each other and run in parallel and independent from each other.

2. A method according to claim 1, wherein the at least a first and the at least a second authentication mechanism are different.

3. A method according to claim 1, wherein the at least one first wireless communication link and the at least one second wireless communication link are concurrently maintained independently of each other.

4. A method according to claim 1, wherein at least one first physical address is associated with the at least one first wireless communication link and at least one second physical address is associated with the at least one second wireless communication link.

5. A method according to claim 4, further comprising:
comparing destination address information of received packets with the at least one first physical address and the at least one second physical address; and
selecting the wireless communication link to be used for receiving a packet on basis of the comparison.

6. A method according to claim 4, further comprising:
comparing destination address information of packets to be transmitted with the at least one first physical address and the at least one second physical address; and
selecting the wireless communication link to be used for transmitting a packet on basis of the comparison.

7. A method according to claim 4, further comprising:
comparing source address information of packets to be transmitted with the at least one first physical address and the at least one second physical address; and
selecting the wireless communication link to be used for transmitting a packet on basis of the comparison.

8. A method according to claim 1, further comprising:
comparing capability information of received packets with requirements of the first authentication mechanism and the second authentication mechanism; and
selecting the wireless communication link to be used for receiving a packet on basis of the comparison.

9. A method according to claim 1, further comprising:
comparing capability information of packets to be transmitted with requirements of the first authentication mechanism and the second authentication mechanism; and
selecting the wireless communication link to be used for transmitting a packet on basis of the comparison.

10. A method according to claim 1, further comprising:
transmitting packets over the at least one first wireless communication link and over the at least one second wireless communication link using a backoff mechanism configured to control access to a communication channel on the at least one first wireless communication link and the at least one second wireless communication link, respectively.

11. A method according to claim 1, wherein the first authentication mechanism comprises an authentication mechanism conforming with the wireless local area network, WLAN, Authentication and Privacy Infrastructure, WAPI, standard.

12. A method according to claim 1, wherein the second authentication mechanism comprises an authentication protocol conforming with a Wi-Fi Alliance standard such as Wi-Fi Direct or Independent Basic Service Set, IBSS.

13. A method according to claim 1, wherein the at least one user device comprises one or more of a Human Interface Device, HID, a mobile telephone, a mouse, a keyboard, a touchpad, a webcam, a headset and a printer.

14. A wireless transmit/receive unit (WTRU), comprising:
at least one first state machine;
at least one second state machine; and
a communication link controller configured to:
establish at least one first wireless communication link at the communication link controller with a base station for transmitting/receiving packets, the at least one first wireless communication link complying with at least a first authentication mechanism;
establish at least one second wireless communication link at the communication link controller with at least one user device for transmitting/receiving packets such that the at least one second wireless communication link comprises a peer-to-peer wireless communication link, the at least one second wireless communication link complying with at least a second authentication mechanism; and
concurrently maintain at the communication link controller the at least one first wireless communication link and the at least one second wireless communication link by concurrently operating the at least one first state machine and the at least one second state machine;
wherein the at least one first state machine and the at least one second state machine are configured to effectuate authentication of communication over the at least one first wireless communication link and the at least one second wireless communication link, respectively,
wherein the first state machine and the second state machine are separate devices different from the communication link controller that utilize the at least a first authentication mechanism and the at least a second authentication mechanism, respectively, and
wherein the at least a first authentication mechanism and the at least a second authentication mechanism are different from each other and run in parallel and independent from each other.

15. A WTRU according to claim 14, further comprising:
an interface unit comprising at least one first physical address associated with the at least one first wireless communication link and at least one second physical address associated with the at least one second wireless communication link.

16. A WTRU according to claim 15, further comprising:
a packet recognition mechanism configured to compare destination address information of received packets with the at least one first physical address and the at least one second physical address, and select usage of the first wireless communication link and the second wireless communication link for receiving a packet on basis of the comparison.

17. A WTRU according to claim 15, further comprising:
a packet arbitration mechanism configured to compare destination address information of packets to be transmitted with the at least one first physical address and the at least one second physical address, and select usage of the first wireless communication link and the second wireless communication link for transmitting a packet on basis of the comparison.

18. A WTRU according to claim 17, further comprising:
a backoff mechanism configured to control access to a communication channel on the at least one first wireless communication link and the at least one second wireless communication link for transmitting packets over the at least one first wireless communication link and over the at least one second wireless communication link, respectively;

wherein the backoff mechanism is activated by the packet arbitration mechanism.

19. A WTRU according to claim 17, wherein the packet arbitration mechanism is configured to compare source address information of packets to be transmitted with the at least one first physical address and the at least one second physical address, and select usage of the wireless communication link for transmitting a packet on basis of the comparison.

20. A WTRU according to claim 14, further comprising:
a packet recognition mechanism configured to compare capability information of received packets with requirements of the first authentication mechanism and the second authentication mechanism, and select usage of the first wireless communication link and the second wireless communication link for receiving a packet on basis of the comparison.

21. A WTRU according to claim 14, further comprising:
a packet arbitration mechanism configured to compare capability information of packets to be transmitted with requirements of the first authentication mechanism and the second authentication mechanism, and select usage of the first wireless communication link and the second wireless communication link for transmitting a packet on basis of the comparison.

22. A WTRU according to claim 14, wherein the at least a first and the at least a second authentication mechanism are different.

23. A WTRU according to claim 14, wherein the communication link controller is configured to concurrently maintain the at least one first wireless communication link and the at least one second wireless communication link independently of each other.

24. A WTRU according to claim 14, wherein the first authentication mechanism comprises an authentication mechanism conforming with the wireless local area network, WLAN, Authentication and Privacy Infrastructure, WAPI, standard.

25. A WTRU according to claim 14, wherein the second authentication mechanism comprises an authentication protocol conforming with a Wi-Fi Alliance standard such as Wi-Fi Direct or Independent Basis Service Set, IBSS.

26. A WTRU according to claim 14, further comprising: at least one ciphering/deciphering engine configured to support operation of authentication protocol of at least one of the at least a first authentication mechanism and the at least a second authentication mechanism.

27. A computer program product embedded in a non-transitory computer readable storage medium adapted to, when executed in a processor unit, perform a method comprising the steps of:

establishing at least one first wireless communication link at a first device with a base station for transmitting/receiving packets, the at least one first wireless communication link complying with at least a first authentication mechanism;

establishing at least one second wireless communication link at the first device with at least one user device for transmitting/receiving packets, the at least one second wireless communication link complying with at least a second authentication mechanism, wherein the at least one second wireless communication link comprises a peer-to-peer wireless communication link; and concurrently maintaining at the first device the at least one first wireless communication link and the at least one second wireless communication link by concurrently operating a first state machine and a second state machine configured to effectuate authentication of communication over the at least one first wireless communication link and the at least one second wireless communication link, respectively, wherein the first state machine and the second state machine are separate devices different from the first device that utilize the at least a first authentication mechanism and the at least a second authentication mechanism, respectively, and wherein the at least a first authentication mechanism and the at least a second authentication mechanism are different from each other and run in parallel and independent from each other.

28. A non-transitory computer-readable storage medium on which there is stored a computer program product adapted to, when executed in a processor unit, perform a method comprising the steps of:

establishing at least one first wireless communication link at a first device with a base station for transmitting/receiving packets, the at least one first wireless communication link complying with at least a first authentication mechanism;

establishing at least one second wireless communication link at the first device with at least one user device for transmitting/receiving packets, the at least one second wireless communication link complying with at least a second authentication mechanism, wherein the at least one second wireless communication link comprises a peer-to-peer wireless communication link; and concurrently maintaining at the first device the at least one first wireless communication link and the at least one second wireless communication link by concurrently operating a first state machine and a second state machine configured to effectuate authentication of communication over the at least one first wireless communication link and the at least one second wireless communication link, respectively, wherein the first state machine and the second state machine are separate devices different from the first device that utilize the at least a first authentication mechanism and the at least a second authentication mechanism, respectively, and wherein the at least a first authentication mechanism and the at least a second authentication mechanism are different from each other and run in parallel and independent from each other.

* * * * *